(12) United States Patent
Chang

(10) Patent No.: US 6,804,448 B2
(45) Date of Patent: Oct. 12, 2004

(54) ELECTRICAL VARIABLE OPTICAL ATTENUATOR

(75) Inventor: Yao-Hao Chang, Tu-chen (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 202 days.

(21) Appl. No.: 10/099,631

(22) Filed: Mar. 15, 2002

(65) Prior Publication Data
US 2003/0086678 A1 May 8, 2003

(30) Foreign Application Priority Data
Nov. 7, 2001 (TW) ..................... 90219112 U (51) Int. Cl.[7] ................................................ G02B 6/00
(52) U.S. Cl. ........................ 385/140; 385/40; 174/50; 174/52; 174/152
(58) Field of Search ............... 385/40, 140; 174/50.52, 174/152

(56) References Cited

U.S. PATENT DOCUMENTS 5,308,925 A * 5/1994 Paterek et al. ....... 174/152 GM
6,140,592 A * 10/2000 Paterek et al. ....... 174/152 GM
6,362,424 B1 * 3/2002 Honkomp et al. ....... 174/50.52
6,483,982 B1 * 11/2002 Takahashi .................. 385/140

* cited by examiner

Primary Examiner—John D Lee
Assistant Examiner—Eric Wong
(74) Attorney, Agent, or Firm—Wei Te Chung (57) ABSTRACT

An electrical variable optical attenuator (10) includes a housing, an attenuating device (3), an optical module (4), and an electrical controlling unit (5). The housing encases the attenuating device, optical module and electrical controlling unit. The electrical controlling unit includes an electrical resistor (57), a terminal holder (56), and a stepping motor (55). The terminal holder includes a plurality of terminals (562), and a plurality of terminal sleeves (563) depending from an insulating plate (561). The terminal holders are fittingly received in positioning holes (131) defined in the housing, so that the terminals can electrically connect the stepping motor and the electrical resistor with an external power supply. The insulating plate is made of rubber, which is softer than a material of the housing. A diameter of the terminal sleeves is slightly greater than a diameter of the positioning holes. Thus the terminal sleeves provide an airtight and watertight seal.

9 Claims, 10 Drawing Sheets

ELECTRICAL VARIABLE OPTICAL ATTENUATOR

BACKGROUND OF THE INVENTION

1. Field of the Invention

The present invention relates to electrical variable optical attenuators, and particularly to an electrical variable optical attenuator having a housing with improved sealing.

2. Description of Related Art

Optical attenuators are widely used in optical transmission systems and optical networks. A variable optical attenuator is a passive optical component used to reduce an intensity of optical signals propagating in an optical fiber. The attenuator can provide a range of degrees of attenuation. A variable optical attenuator can be either an electrical or a manual attenuator. An electrical variable optical attenuator is more widely used in optical transmission systems and optical networks, because it can control reduction of intensity of optical signals more precisely than a manual variable attenuator. The electrical variable optical attenuator typically comprises an electrical controlling unit.

The electrical controlling unit and other optical components in the attenuator must be kept clean and dry, to assure proper operation of the attenuator. A typical electrical controlling unit comprises an electrical resistor, a plurality of conductive terminals and a stepping motor. The terminals connect the stepping motor and the electrical resistor with an external power supply. Gaps between the terminals and a housing of the attenuator have to be sealed to prevent water vapor from infiltrating into the attenuator and contaminating the electrical control unit and other optical components therein.

A conventional electrical variable optical attenuator usually has glass fillers to seal the gaps. Glass powder is provided between each of the terminals and the housing, and then heated to a temperature between 700 and 800 degrees Centigrade. The glass powder melts, thereby sealing the gaps.

However, glass filler sealing technology is very time-consuming and troublesome, and results in high manufacturing costs. Accordingly, an improved electrical variable optical attenuator which has simple sealing between conductive terminals and a housing thereof is desired.

SUMMARY OF THE PRESENT INVENTION

An object of the present invention is to provide an electrical variable optical attenuator having improved sealing.

Another object of the present invention is to provide an electrical variable optical attenuator which is inexpensive to manufacture.

To achieve the above objects, an electrical variable optical attenuator in accordance with the present invention comprises a housing, an attenuating device, an optical module, and an electrical controlling unit. The housing comprises a base and a cover which cooperatively encase the attenuating device, the optical module and the electrical controlling unit. The electrical controlling unit comprises an electrical resistor, a terminal holder and a stepping motor. The terminal holder comprises a plurality of conductive terminals, and a plurality of terminal sleeves depending from an insulating plate. The terminal holders are fittingly received in positioning holes defined in the base, so that the terminals can electrically connect the stepping motor and the electrical resistor with an external power supply. The insulating plate is made of rubber, which is softer than a material of the housing. A diameter of the terminal sleeves is slightly greater than a diameter of the positioning holes. Thus the terminal sleeves 563 provide an airtight and watertight seal protecting the attenuating device, optical module and electrical controlling unit.

Other objects, advantages and novel features of the invention will become more apparent from the following detailed description when taken in conjunction with the accompanying drawings, in which:

DETAILED DESCRIPTION OF PREFERRED EMBODIMENT OF THE PRESENT INVENTION

Figure 1:
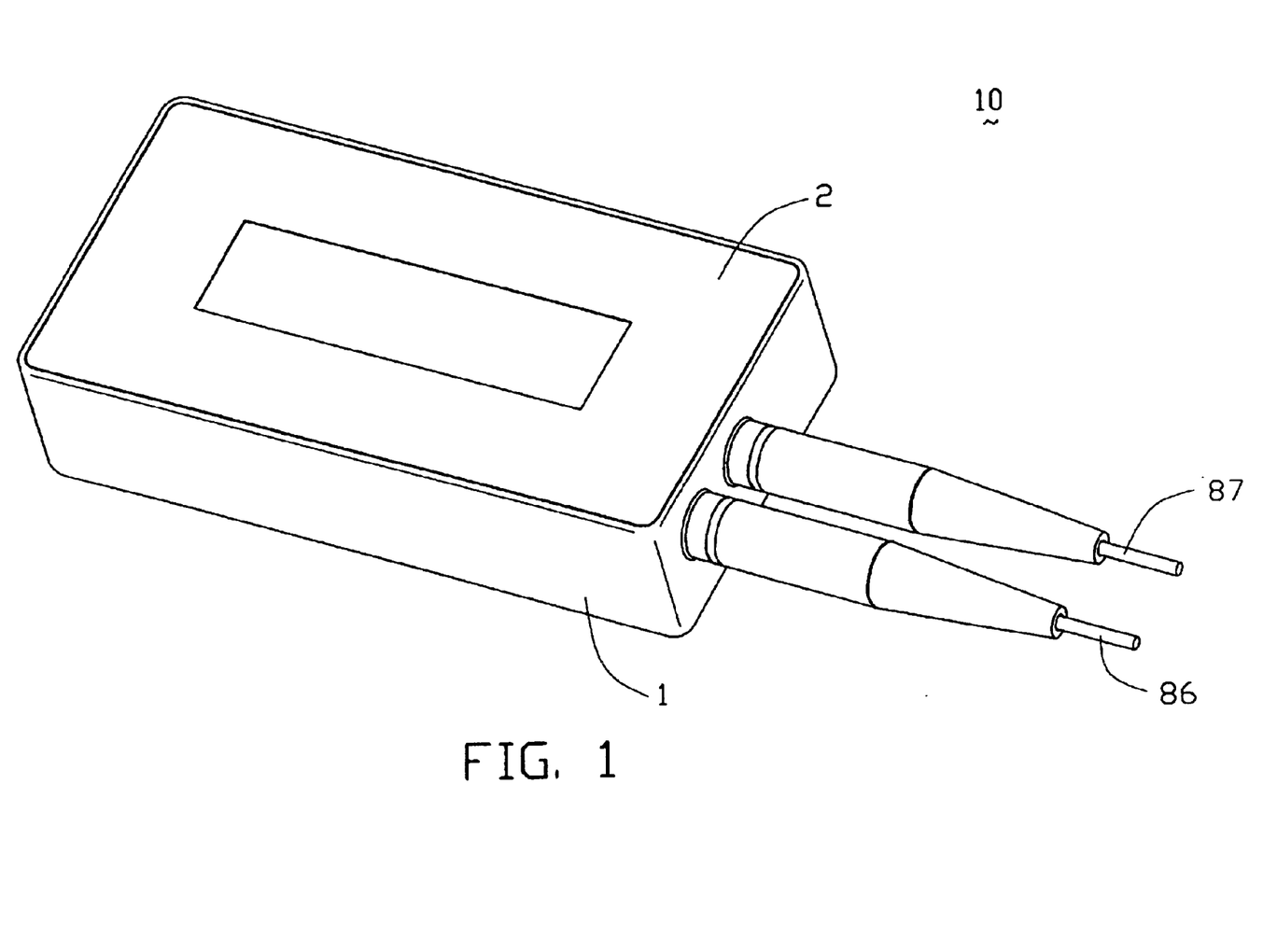
FIG. 1 is a perspective view of an electrical variable optical attenuator in accordance with the present invention.
Figure 2:
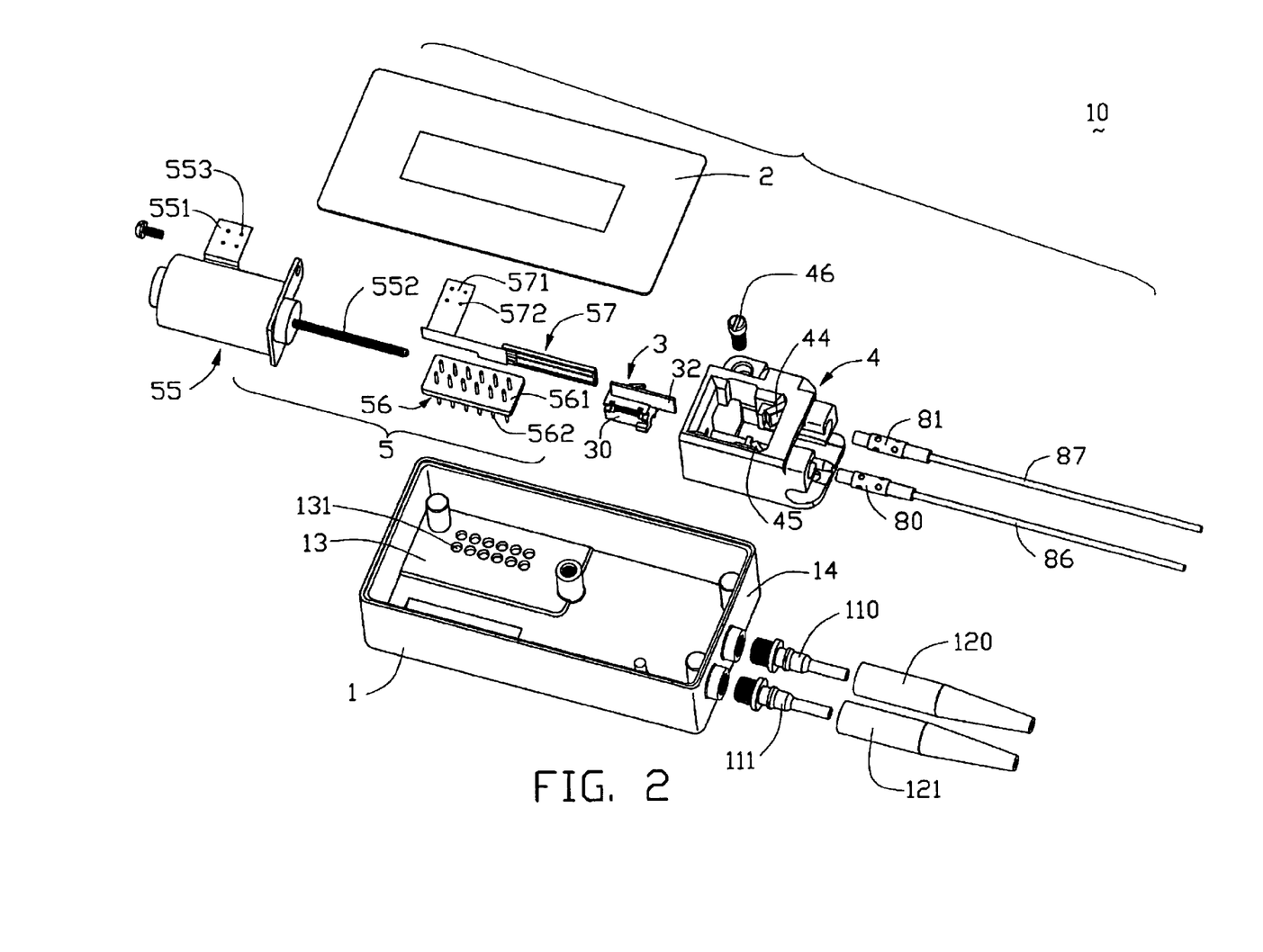
FIG. 2 is an exploded view of the attenuator of FIG. 1.
Figure 3:
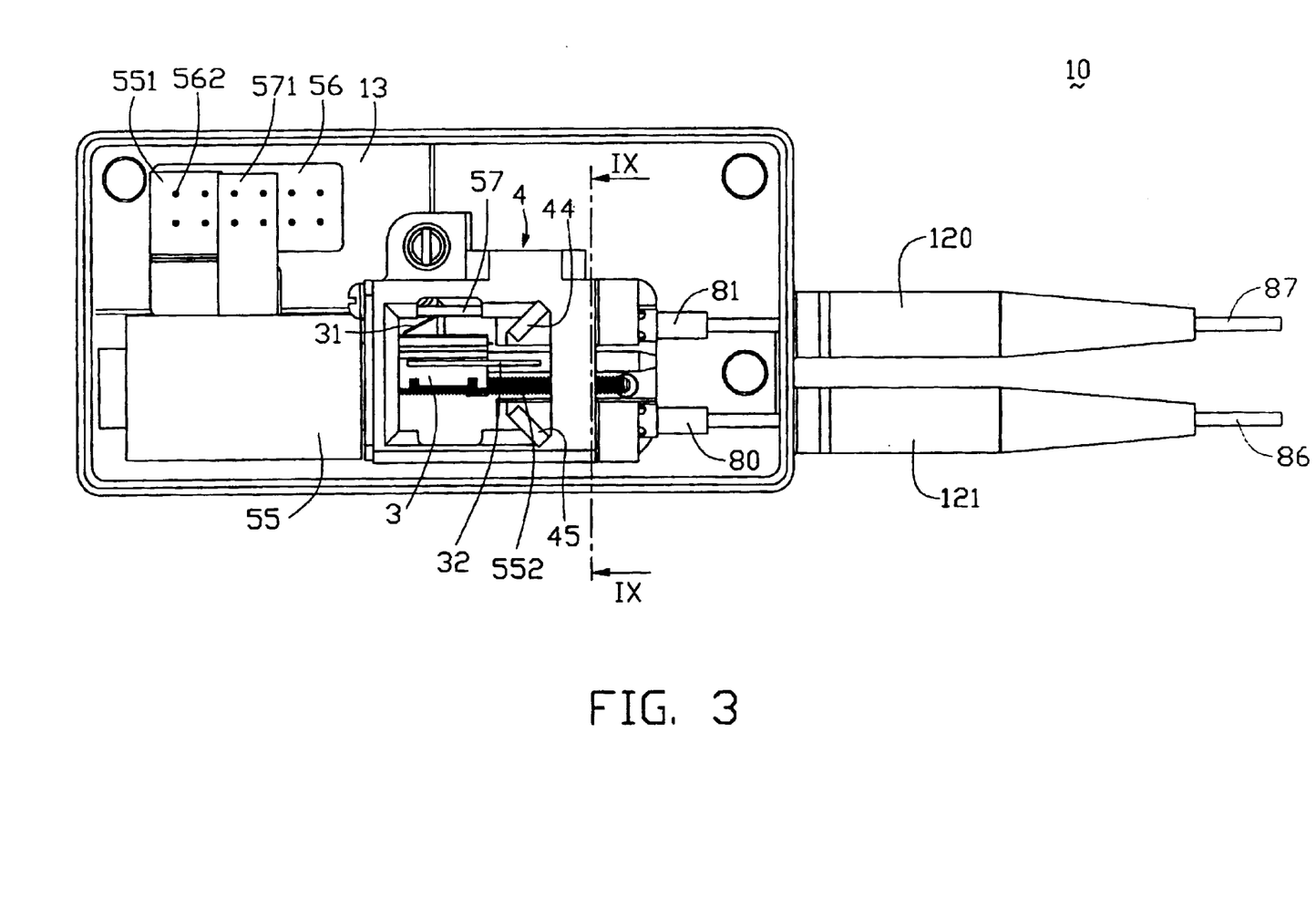
FIG. 3 is a top plan view of the attenuator of FIG. 1, with a cover of the attenuator removed.

Referring to FIGS. 1 to 3, an electrical variable optical attenuator 10 in accordance with a preferred embodiment of the present invention comprises an attenuating device 3, an optical module 4, an electrical controlling unit 5, input and output optical fibers 87, 86, and a housing (not labeled). The housing comprises a base 1 and a cover 2. In the preferred embodiment, the base 1 and the cover 2 are made of metal. The input fiber 87 is used to transmit optical signals into the attenuator 10. After being attenuated, the optical signals are output by the output fiber 86.

The base 1 comprises a bottom wall 13, a front wall 14, and a plurality of positioning holes 131 defined in the bottom wall 13. The output fiber 86 is connected with an output optical fiber collimator 80. The output fiber 86 fits through an optical fiber holder 111 which is screwed into the front wall 14. A protecting sheath 121 encloses the holder 111 and a portion of the output fiber 86 near the holder 111. The input fiber 87 is connected with an input optical fiber collimator 81. The input fiber 87 fits through an optical fiber holder 110 which is screwed into the front wall 14. A protecting sheath 120 encloses the holder 110 and a portion of the input fiber 87 near the holder 110.

Figure 5:
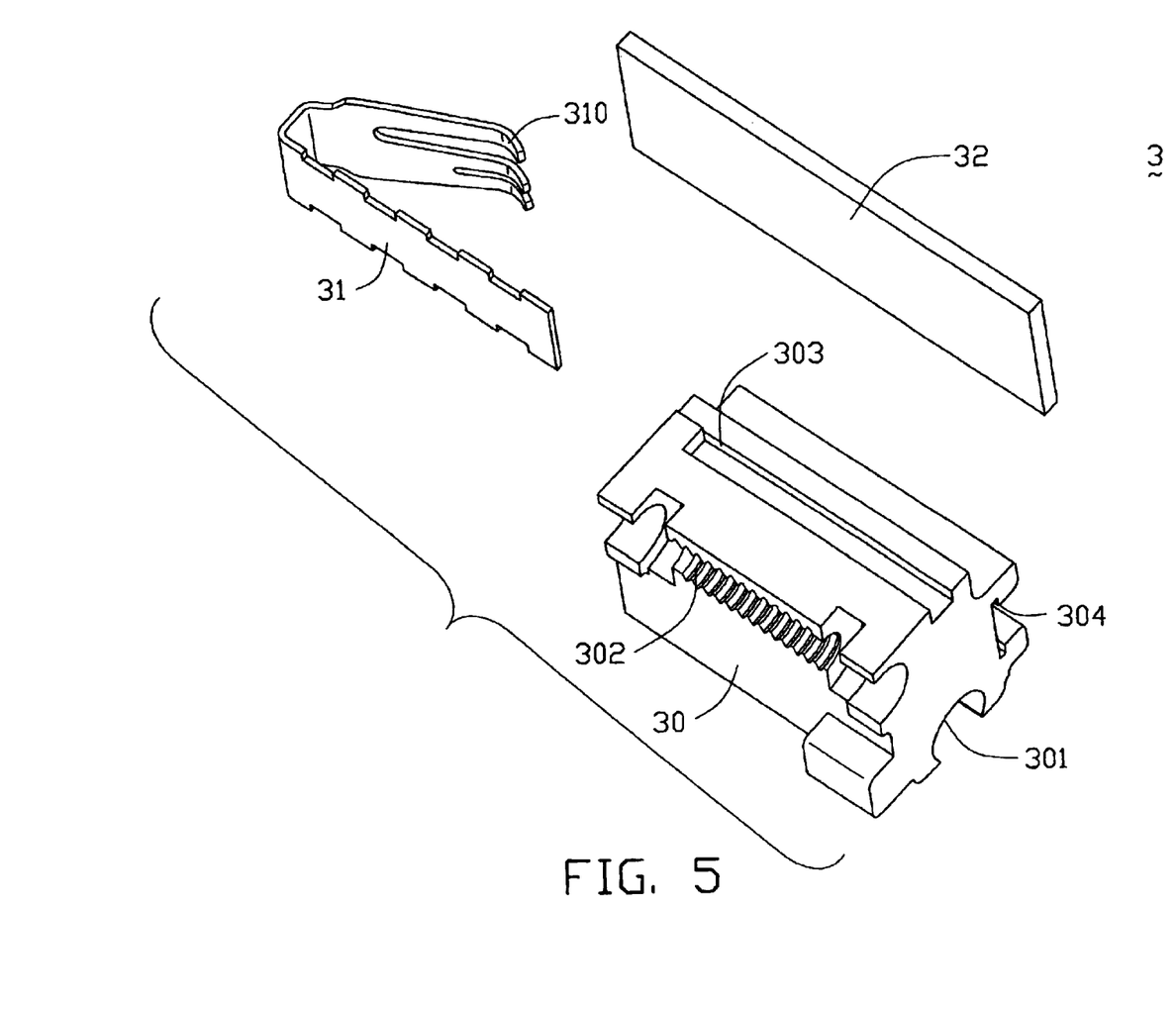
FIG. 5 is an exploded perspective view of an attenuating device of the attenuator of FIG. 2.

Referring to FIG. 5, the attenuating device 3 comprises a graded optical absorbent filter 32, a slider 31, and a seat 30. The seat 30 comprises a lower guide slot 301, a horizontal row of generally vertical screw threads 302, an upper mounting groove 303, and a retaining slot 304. The filter 32 is securely fastened in the mounting groove 303, and is thereby securely mounted on the seat 30. The slider 31 comprises a plurality of resilient slide fingers 310. The filter 32 has a continuously changing coefficient of optical absorption along its length.

Figure 4:
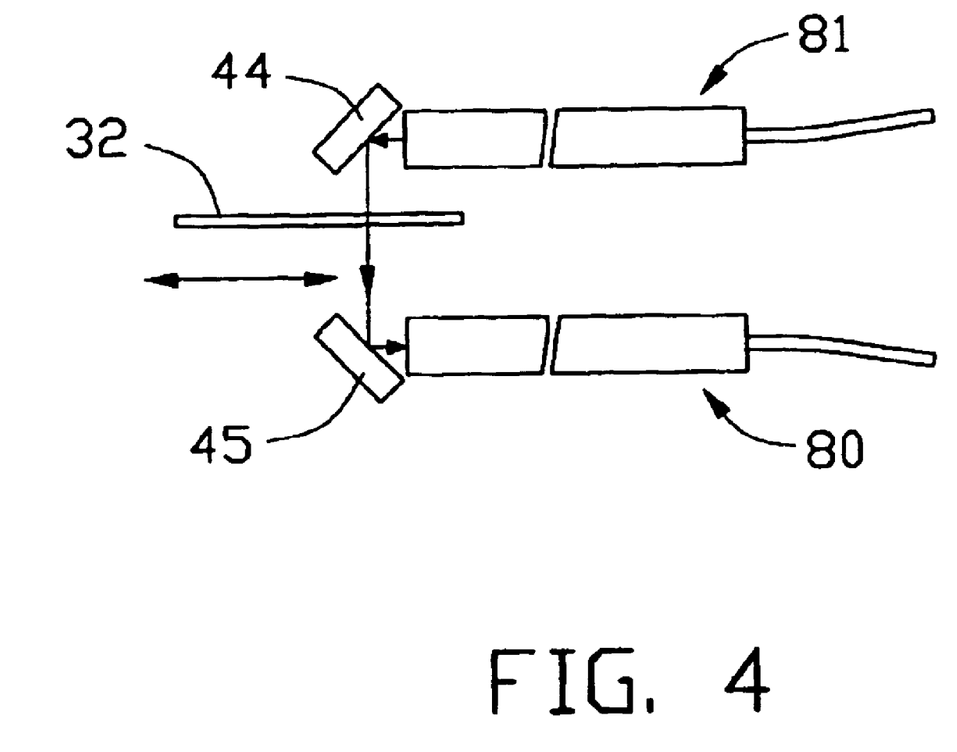
FIG. 4 is a schematic diagram of an optical path of the attenuator of FIG. 2.
Figure 6:
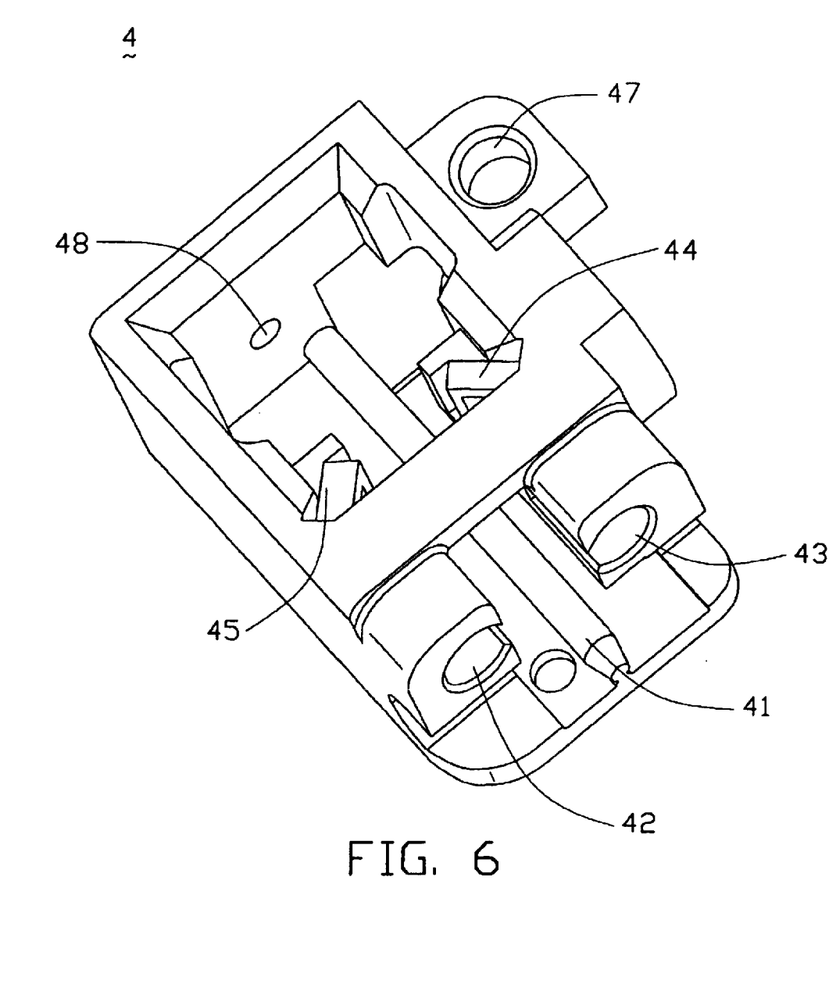
FIG. 6 is a perspective view of an optical module of the attenuator of FIG. 2.

Referring to FIGS. 4 and 6, the optical module 4 comprises a guide rail 41, two optical fiber collimator slots 42, 43 for accommodating the output and input collimators 80, 81, a first reflective mirror 44, an opposite second reflective mirror 45, a fastening hole 47 defined in a side flange (not labeled), and a through hole 48 defined in a rear wall (not labeled). A bolt 46 (see FIG. 2) is for extending through the fastening hole 47 to fasten the optical module 4 to the base 1.

Referring to FIGS. 2, 3, 7 and 8, the electrical controlling unit 5 functions to control movement of the attenuating device 3. The electrical controlling unit 5 comprises an electrical resistor 57, a terminal holder 56, and a stepping motor 55. The terminal holder 56 comprises a plurality of conductive terminals 562, and a plurality of generally cylindrical terminal sleeves 563 depending from a bottom face of an insulating plate 561. Each terminal 562 comprises an annular bead 564. In the preferred embodiment, the terminals 562 are respectively mounted in the terminal sleeves 563 and insulating plate 561 by insert molding. The beads 564 prevent the terminals 562 from failing out from the insulating plate 561. The terminal sleeves 563 correspond to the positioning holes 131 of the bottom wall 13 of the base 1, so that the terminals 562 can electrically connect both the stepping motor 55 and the electrical resistor 57 with an external power supply (not shown). Some of the terminals 562 are fixed in a plurality of conductive holes 553 of a first conductive plate 551 of the stepping motor 55, and the other terminals 562 are fixed in a plurality of conductive holes 572 of a second conductive plate 571 of the electrical resistor 57. A driving screw 552 of the stepping motor 55 is used to drive the attenuating device 3. The electrical resistor 57 is used to determine the location of the attenuating device 3.

Figure 7:
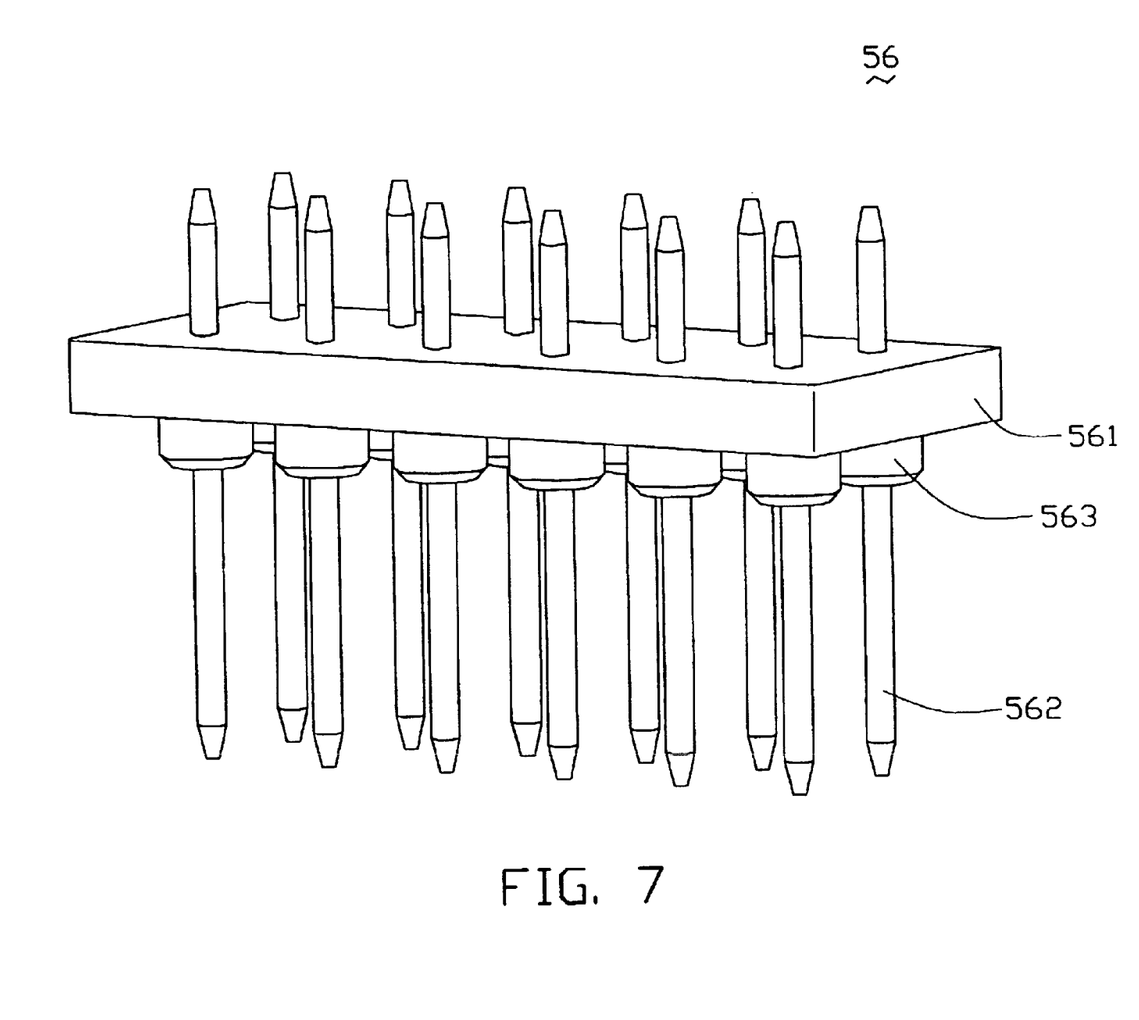
FIG. 7 is a perspective view of a terminal holder of the attenuator of FIG. 2.
Figure 8:
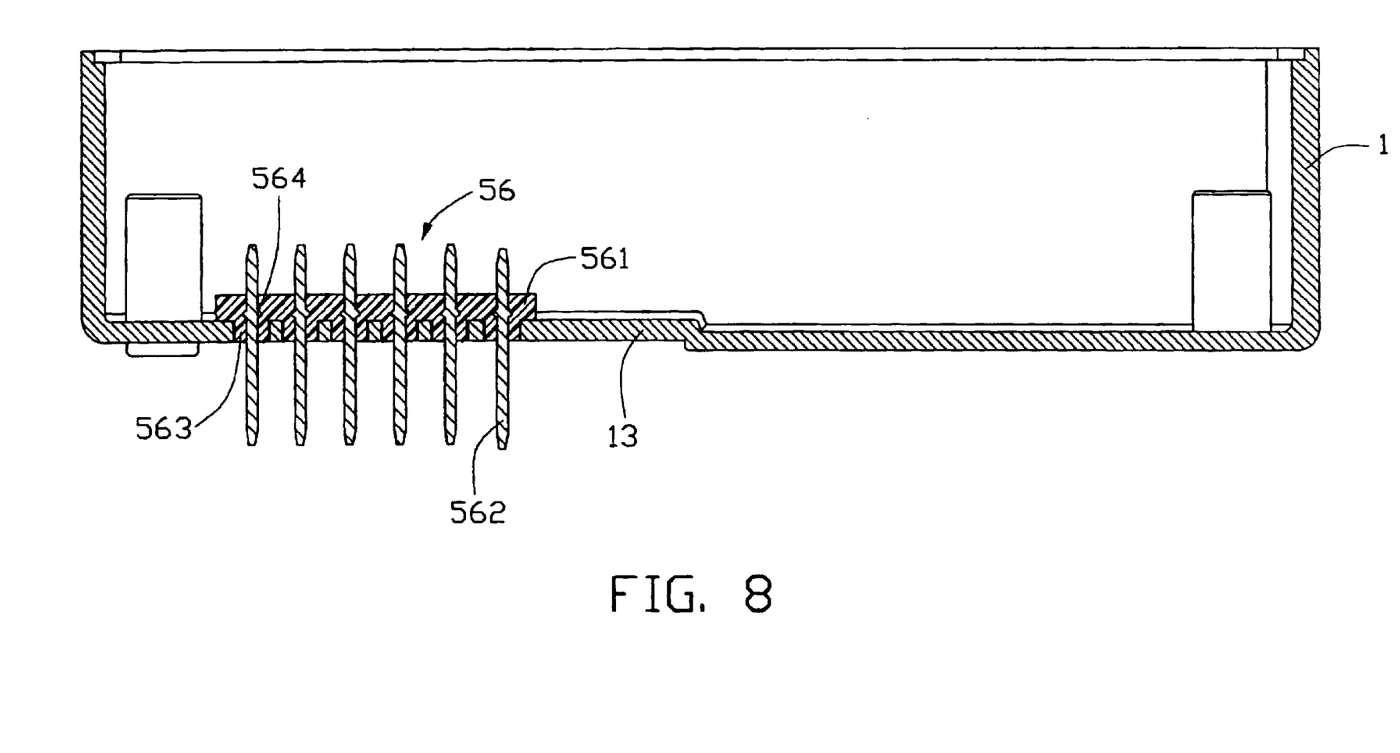
FIG. 8 is a cross-sectional view of the terminal holder attached to a base of the attenuator of FIG. 2.

In the preferred embodiment, the insulating plate 561 of the terminal holder 56 is made of rubber. The rubber is softer than the material of the base 1 and the cover 2. Each terminal sleeve 563 is generally cylindrical, and has a diameter slightly greater than a diameter of each positioning hole 131 of the bottom wall 13 of the base 1. Each terminal sleeve 563 has a bevelled lower end for easy insertion into a corresponding positioning hole 131.

Figure 9:
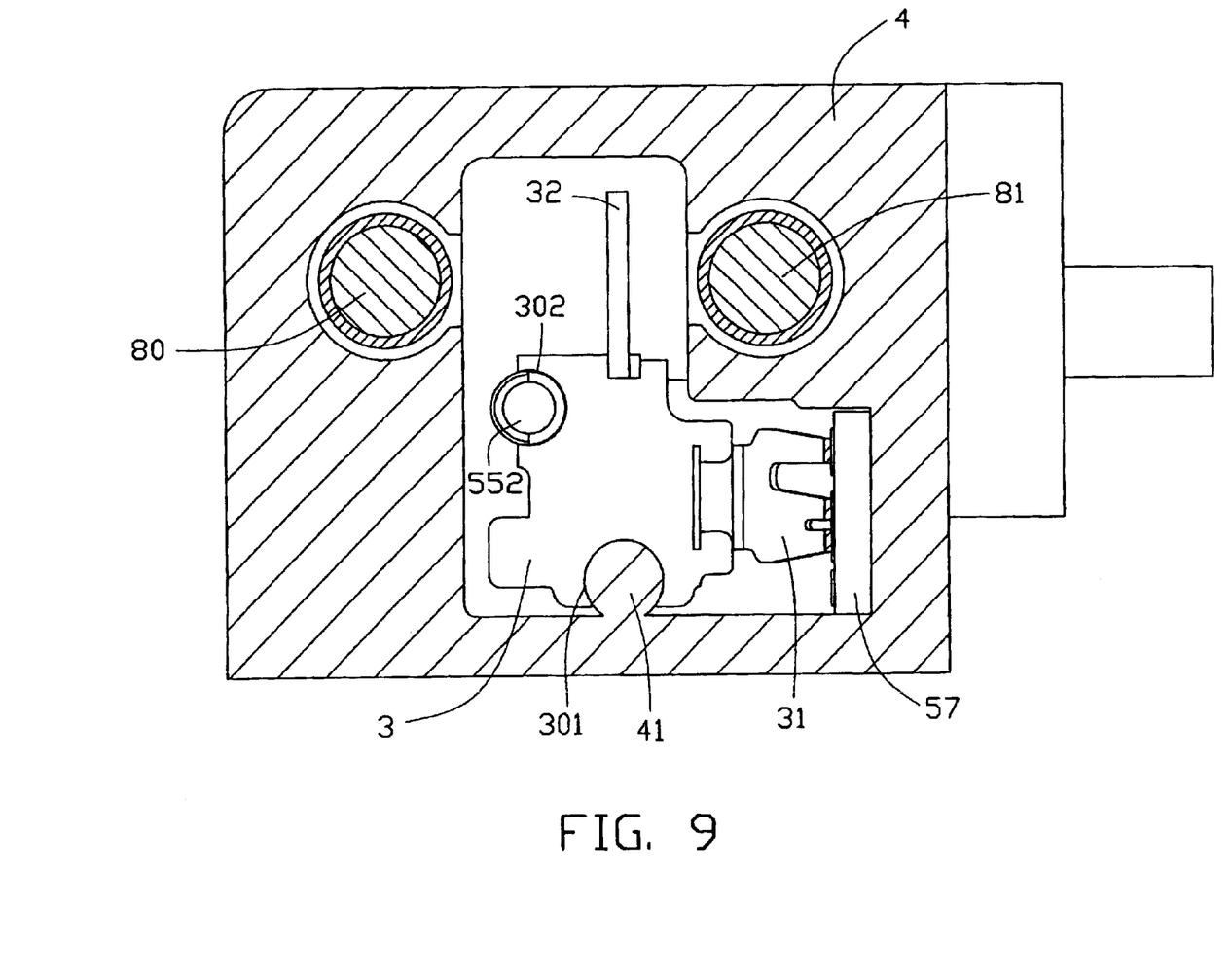
FIG. 9 is a cross-sectional view of part of the attenuator of FIG. 3, taken along line IX—IX of FIG. 3.
Figure 10:
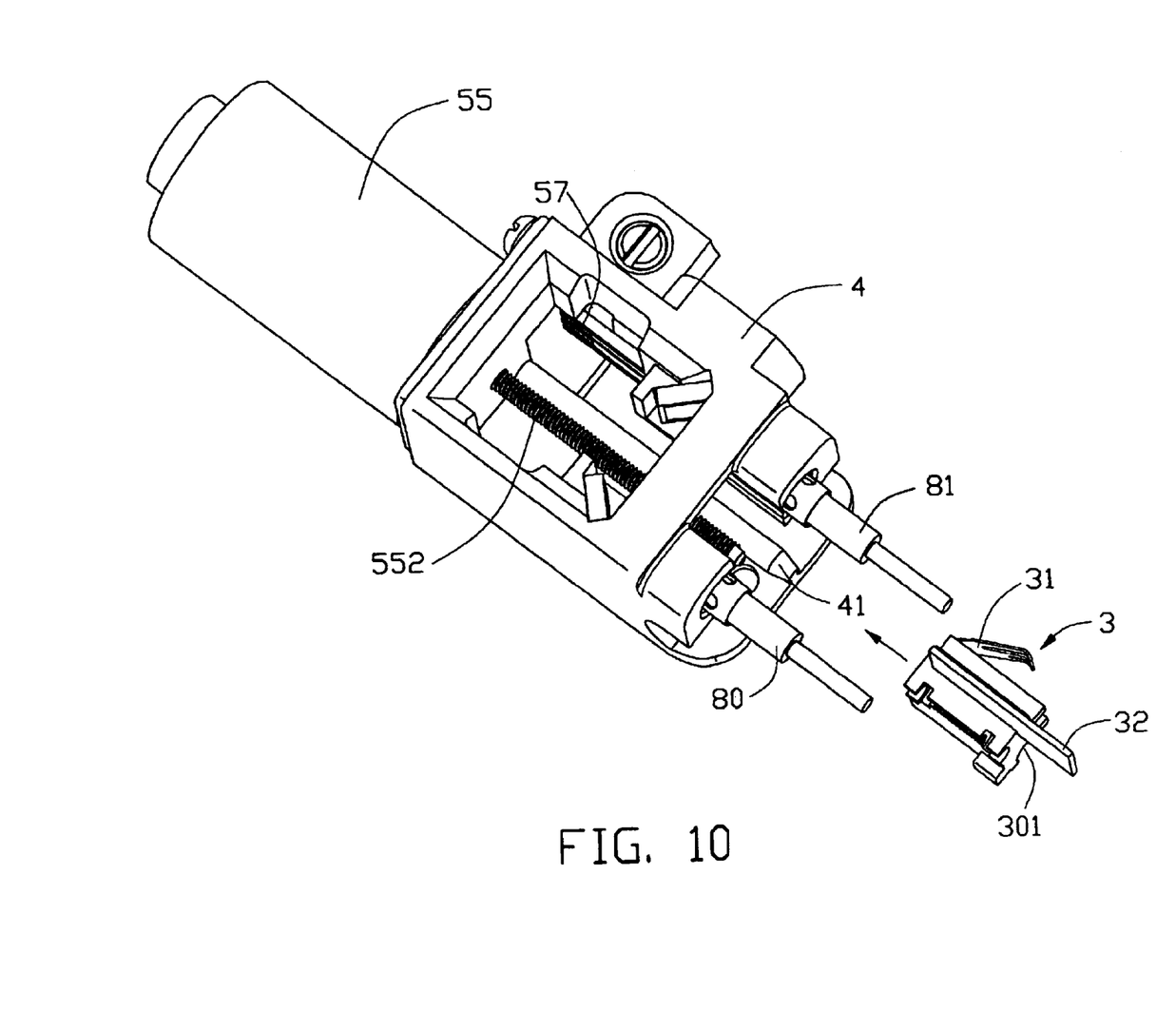
FIG. 10 is a perspective view showing mounting of the optical attenuating device of FIG. 5, fully assembled, into an assembly of the attenuator of FIG. 2 that comprises a stepping motor, the optical module and two optical collimators.

Referring to FIGS. 9 and 10, in assembly, the stepping motor 55 is attached to the optical module 4. The driving screw 552 of the stepping motor 55 is passed through the through hole 48 of the optical module 4. The attenuating device 3 is attached in the optical module 4. The internal screw thread 302 of the seat 30 movably engages the driving screw 552. The guide slot 301 movably receives the guide rail 41 of the optical module 4. The seat 30 is thus movably mounted in the optical module 4, and can move along a straight path upon rotation of the driving screw 552. The filter 32 is located between the first and second mirrors 44, 45. The filter 32 is positioned substantially perpendicular to a light path from the first mirror 44 to the second mirror 45, and always intersects the light path. A main portion of the slider 31 is secured in the retaining slot 304 of the base 30. The slide fingers 310 resiliently and electrically contact a surface of the electrical resistor 57. A position of the slide fingers 310 determines an electrical resistance of the electrical resistor 57. The bolt 46 is extended through the fastening hole 47 of the optical module 4 to fasten the optical module 4 to the base 1. The combined attenuating device 3, optical module 4 and electrical controlling unit 5 is then encased by the base 1 and the cover 2. The terminal sleeves 563 of the terminal holder 56 resiliently fill the positioning holes 131 of the bottom wall 13 of the base 2. A bottom face of the insulating plate 561 of the terminal holder 56 abuts against the bottom wall 13 of the base 2. Thus the terminal holder 56 provides an airtight and watertight seal for the attenuator 10. The optical fiber holders 110, 111 are screwed into the front wall 14 of the base 1, thereby attaching the input and output collimators 81, 80 to the optical module 4.

Referring to FIG. 4, in use, the first and second mirrors 44, 45 are positioned so that optical signals received from the input collimator 81 are sequentially reflected by the first and second mirrors 44, 45, and then accurately enter the output collimator 80. The first mirror 44 reflects optical signals input from the input collimator 81. The reflected optical signals then pass through the filter 32, and are thereby attenuated. The attenuated optical signals are then reflected by the second mirror 45, and enter the output collimator 80. The filter 32 has a continuously changing coefficient of optical absorption along its length. Therefore, when the seat 30 with the filter 32 is moved by the stepping motor 55, a degree of attenuation of optical signals traveling from the first mirror 44 to the second mirror 45 is changed. Thus a variety of desired attenuated optical signals can be obtained by shifting the filter 32. Furthermore, the guide slot 301 and the guide rail 41 cooperate to reduce variation in attenuation caused by mechanical vibration of the driving screw 552. This ensures stable operation of the attenuator 10.

The insulating plate 561 of the attenuator 10 of the present invention is made of rubber. The rubber is softer than the material of the base 1 and the cover 2. Each cylindrical terminal sleeve 563 has a diameter slightly greater than a diameter of the positioning holes 131 of the bottom wall 13 of the base 1. Thus the terminal sleeves 563 provide an airtight and watertight seal protecting the attenuating device 3, optical module 4 and electrical controlling unit 5. The attenuator 10 has superior sealing, and needs relatively little time to produce and assemble. This reduces costs. Furthermore, the above-described means of sealing may also be adopted for other optical devices having electrical controlling units or other components requiring protection. Such optical devices include optical switches, optical isolators and optical circulators.

Other modifications and adaptations of the above-described embodiment of the present invention may be made to meet particular requirements. This disclosure is intended to exemplify the invention without limiting its scope. All modifications that incorporate the invention disclosed in the preferred embodiment are to be construed as coming within the scope of the appended claims or the range of equivalents to which the claims are entitled.

What is claimed is:

1. An electrical variable optical attenuator for attenuating input optical signals, comprising:

a housing having a front wall, and a bottom wall defining a plurality of positioning holes therein;

an input optical fiber and an output optical fiber mounted in the front wall for transmitting the input optical signals and attenuated output optical signals, respectively;

an optical module received in the housing and having first and second reflective mirrors mounted therein, wherein the input optical signals from the input optical fiber are successively reflected by the first and the second reflective mirrors to enter the output optical fiber;

an attenuating device movably mounted in the optical module, said attenuating device having a graded optical absorbent filter through which the optical signals pass when reflected form the first to the second reflective mirror; and an electrical controlling unit for controlling movement of the attenuating device in the optical module so that the optical signals reflected from the first to the second reflective mirror can pass through different parts of the graded optical absorbent filter; the electrical controlling unit comprising a stepping motor drivably connecting with the attenuating device, and a terminal holder, the terminal holder comprising a plurality of conductive terminals adapted for connecting an external power supply with the stepping motor, an insulating plate to which the conductive terminals are secured, and a plurality of terminal sleeves depending from a bottom face of the insulating plate and fitting into the positioning holes of the bottom wall of the housing, the bottom face abutting against the bottom wall of the housing, said conductive terminals extending through the sleeves.

2. The electrical variable optical attenuator as described in claim 1, wherein the insulating plate is made of rubber, and the housing is made of metal.

3. The electrical variable optical attenuator as described in claim 1, wherein the terminals, the terminal sleeves and the insulating plate are combined together by insert molding.

4. The electrical variable optical attenuator as described in claim 3, wherein each of the conductive terminals comprises a protrusion engaging with the insulating plate.

5. The electrical variable optical attenuator as described in claim 4, wherein the protrusion has a bead-like configuration.

6. The electrical variable optical attenuator as described in claim 1, wherein each of the terminal sleeves has a generally cylindrical configuration.

7. The electrical variable optical attenuator as described in claim 6, wherein each of the terminal sleeves has a diameter slightly greater than a diameter of a corresponding positioning hole of the housing.

8. The electrical variable optical attenuator as described in claim 6, wherein each of the terminal sleeves has a bevelled lower end for easy insertion into a corresponding positioning hole of the housing.

9. The electrical variable optical attenuator as described in claim 1, wherein the filter has a continuously changing coefficient of optical absorption along its length, whereby when the attenuating device is moved by the stepping motor, the optical signals passing from the first reflective mirror through the filter to the second reflective mirror are attenuated to a different extent.

* * * * *